United States Patent [19]

Christensen, Jr. et al.

[11] Patent Number: 4,796,271
[45] Date of Patent: Jan. 3, 1989

[54] HIGH DUTY FACTOR RARE GAS HALIDE LASER

[75] Inventors: Clad P. Christensen, Jr., Washington, D.C.; Christopher Moutoulas, Beltsville, Md.

[73] Assignee: Potomac Photonics, Inc., College Park, Md.

[21] Appl. No.: 69,220

[22] Filed: Jul. 2, 1987

[51] Int. Cl.$^4$ .............................................. H01S 3/22
[52] U.S. Cl. ........................................ 372/57; 372/61; 372/59; 372/35; 372/82
[58] Field of Search ....................... 372/87, 82, 57, 61, 372/62, 64, 65, 56

[56] References Cited

U.S. PATENT DOCUMENTS

| | | | |
|---|---|---|---|
| 4,589,114 | 5/1986 | Sutter, Jr. et al. | 372/61 |
| 4,607,371 | 8/1986 | Eden et al. | 372/56 |
| 4,620,306 | 10/1986 | Sutter, Jr. et al. | 372/82 |
| 4,631,732 | 12/1986 | Christensen | 372/87 |

*Primary Examiner*—Leon Scott, Jr.
*Attorney, Agent, or Firm*—Wegner & Bretschneider

[57] ABSTRACT

A rare gas halide laser has a hollow discharge tube disposed between two metal electrodes, and a high frequency electrical generator attached to the electrodes. In order to increase the duty factor of the laser, the bore in the discharge tube is formed with two opposing walls which are separated by a small distance, preferably less than 0.5 millimeters, so that the rate of recombination of the halide compound is increased.

13 Claims, 2 Drawing Sheets

HIGH DUTY FACTOR RARE GAS HALIDE LASER

BACKGROUND OF THE INVENTION

1. Field of the Invention

This invention relates to the construction and operation of rare gas halide excimer lasers capable of generating optical pulse trains characterized by a high duty factor (ratio of pulse duration to pulse repetition period). Application of prior art in rare gas halide laser technology has resulted in lasers with pulse durations in the 10 to 1000 nanosecond range and pulse repetition rates of less than 10 kHz with corresponding duty factors of less than 1 percent. We here disclose a new laser geometry that allows operation of rare gas halide lasers with greatly extended pulse durations and pulse repetition rates so that the laser output more closely approximates continuous emission.

The invention comprises features of construction, combinations of elements, and arrangements of parts forming a rare gas halide laser structure capable of high duty factor operation.

2. Object of the Invention

An object of the invention is to provide a simple technique for generation of continuous or quasi-continuous laser radiation in the ultraviolet portion of the spectrum.

A second object of the invention is to provide a structure for excitation of rare gas halide laser gases that utilizes atomic and molecular processes occuring at the walls of the structure to extend the laser pulse duration and pulse repetition rate.

A third object of the invention is to provide a laser excitation structure that allows very high pulse repetition rates without need for rapid flow of the laser gas through the discharge region.

A fourth object of the invention is to provide a laser excitation structure that allows operation of a rare gas halide laser with laser pulse duration exceeding 100 nanoseconds.

A fifth object of the invention is to provide a rare gas halide laser excitation structure capable of withstanding exposure to halogen gases thereby providing of extended operating and storage lifetime.

A sixth object of the invention is to provide a rare gas halide laser excitation structure capable of removing heat from the discharge region at a rate adequate to allow high duty factor operation without gas flow.

3. Description of Prior Art

Newman (U.S. Pat. No. 4,381,564) has disclosed rare gas halide waveguide lasers with pulsed dc excitation capable of ultraviolet laser emission with pulse durations of less than 30 nanoseconds and pulse repetition rates potentially extending to 10 kHz. The corresponding maximum duty factor for this laser is thus limited to 0.03 percent. Since excitation of this device is intrinsically of short duration, higher duty factors cannot be achieved by extension of pulse duration. Pulse repetition rates in the Newman device are limited by gas heating and halogen donor recombination processes discussed in later paragraphs.

Christensen and Waynant (Appl. Phys. Lett, 41, 794 (1982) have suggested the utility of electrodeless radio frequency excitation for long pulse rare gas halide excimer lasers and described a xenon fluoride laser with a relatively inert ceramic discharge tube that operated at an undisclosed repetition rate with a pulse duration limited to approximately 300 nanoseconds by halogen donor dissociation. However, these authors did not consider design features necessary for high repetition rate and high duty factor operation.

Christensen, Waynant, and Feldman (Appl. Phys. Lett. 46, 321 (1985) demonstrated an electrodeless discharge XeCl laser with a pulse duration of 320 nanoseconds and suggested the feasibility of operation at repetition rates of tens of kilohertz (resulting in duty factors of less than 1%). Christensen discloses a similar device in U.S. Pat. No. 4,631,732.

4. Technical Background

All devices associated with the prior art are intrinsically limited in either pulse duration or pulse repetition rate to duty factors of less than 1%. This limit is imposed by duration of the pulsed excitation, dissociation of the halogen donor molecules in the gas discharge, and removal of waste heat from the discharge region. Use of electrodeless rf or microwave discharges has been shown to allow homogeneous, long-term excitation of a high pressure gas, however, problems associated with halogen donor recombination and heat removal previously have not been addressed in a manner that allows cw or quasi-cw operation.

Halogen donor dissociation is a process that is essential to the operation of a rare gas halide laser. The excited rare gas halide molecule which produces optical gain is normally formed by reaction of a halide compound (hydrogen chloride, bromine, fluorine, nitrogen trifluoride, or other suitable halogen bearing molecule) which serves as a halogen donor with an appropriate excited rare gas atom. After emitting a laser photon the excited rare gas halide molecule rapidly dissociates to yield a halogen atom and a rare gas atom. However, recombination of the halogen atom with the corresponding molecular fragment to reform the halogen donor molecule is a relatively slow three-body process in the bulk gas and typically requires approximately 100 microseconds. In the electric discharge used for laser excitation the halogen donor molecule is normally dissociated much faster than it can recombine in the bulk gas. When the halogen donor concentration falls below a certain level laser operation stops, and excitation of the gas must be halted for a period adequate to allow recombination. Laser pulse duration is typically limited to a few hundred nanoseconds and laser pulse repetition rate limited to a few tens of kilohertz. Consequently lasers of the prior art that do not utilize rapid gas flow and rely on halogen donor recombination in the bulk gas are intrinsically limited to duty factors of approximately 1%.

Waste heat generation in the discharge region also limits the duty factor achievable with rare gas halide lasers associated with prior art. At excitation rates sufficient to produce useful optical gains waste heat generated in a rare gas halide laser discharge would heat the laser gas at a rate exceeding 1 million degrees Centigrade per second if it were thermally insulated from its surroundings. Although some rare gas halide laser systems are operable at temperatures of several hundred degrees Centigrade, higher temperatures are deleterious to laser action and often introduce refractive index variations that distort the laser beam. Efficient cooling is thus necessary for high duty factor operation.

BRIEF SUMMARY OF THE INVENTION

The invention utilizes a high-frequency electrodeless discharge to excite a rare gas halide laser gas mixture contained in a dielectric discharge tube characterized by closely-spaced inner wall. Use of a high-frequency electrodeless discharge configuration whereby metal electrodes are positioned outside the discharge tube allows uniform, long-duration excitation of the laser gas and eliminates chemical reaction between the electrodes and halide compounds in the laser gas.

Very high duty factor operation is achieved by configuring the discharge tube so that halogen donor fragments can diffuse to the tube walls and recombine there on overall time scales shorter than those required for recombination in the bulk gas. It is well known in the art of molecular kinetics that molecular recombination can occur almost instantaneously when molecular fragments are very near or in contact with a solid surface. Consequently, rapid recombination of halogen donor molecules can be achieved provided that the molecular fragments rapidly diffuse to the tube walls. The rate of diffusion of molecular fragments to the tube walls is known to be inversely proportional to both the gas pressure and the square of the width of the discharge region. Using known rates of molecular diffusion it can be shown that halogen donor recombination in typical rare gas halide laser plasmas can be accelerated by using a discharge configuration in which all of the discharge plasma providing optical amplification is less than about 0.2 millimeters from a wall surface.

The rate of at which waste heat is conducted out of the discharge volume to the tube walls is also known to be inversely proportional to the square to the width of the discharge so that the presence of closely spaced thermally conducting walls also facilitates cooling of the laser medium.

To prevent reaction of halogen atoms with the tube walls, thereby precluding halogen donor recombination, the tube walls exposed to the discharge must be fabricated from a suitably inert material. Several metal oxides and metal fluorides exhibit sufficient chemical inertness to withstand exposure to halogen species in the discharge for periods of tens to hundreds of hours. Silicon dioxide also has been found to be suitable for use with some halogens.

In many practical implementations of the invention the discharge tube will be of a length such that ultraviolet laser beams passing through the discharge region will be guided by the tube walls due to the small dimensions of the tube bore. Consequently, it is necessary in these implementations that the inner bore be adequately straight and of an appropriate surface finish to allow guiding of ultraviolet laser light with minimal optical loss.

The discharge tube walls must be characterized by a low thermal resistance to allow adequate cooling of the laser gas, and a means must be provided for rapid transport of heat away from the region occupied by the tube. In this invention the width of the discharge tube walls may be adjusted to facilitate removal of waste heat from the discharge region. One or more of the excitation electrodes also may be configured to act as a heat sink to aid in rapid removal of waste heat from the discharge region, and the discharge tube also may be immersed in a liquid for more efficient heat removal.

DETAILED DESCRIPTION OF THE INVENTION

Figure 1A:
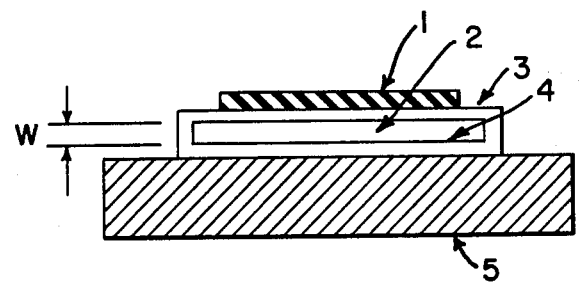
FIG. 1(B) is a side view of the discharge tube and excitation electrodes of FIG. 1(A)

The principal features of construction of the preferred embodiment are shown in FIG. 1. During operation a high-power high-frequency (200 MHz to 10 GHz) electrical generator is connected to electrodes 1 and 5. If the excitation frequency is such that the length of the electrode is greater than approximately one-quarter of the electrical wavelength the electrode thickness is contoured along its length to compensate for local voltage variations produced by standing wave effects. The rectangular discharge tube 3 is filled with a rare gas halide laser gas mixture composed predominately of rare gases and halogen compounds. The high frequency electric field capacitively coupled through the walls of the discharge tube 3 induces an electrical discharge in the region 2. Rare gas halide excimer species produced in the discharge produce optical gain at specific wavelengths in the ultraviolet portion of the spectrum. During operation the laser beam passes through the discharge region 2, and experiences optical amplification.

High duty factor operation of the laser is achieved when the width, W, of the small cross-sectional dimension of the discharge tube is small enough to allow rapid recombination of halogen compounds. In general the square of the width, W, must be less than the product of the molecular diffusion coefficient of the halogen donor and the laser pulse repetition period. For typical rare gas halide laser gas mixtures at pressures of 2 atmospheres the width, W, must be less than 0.2 millimeters to achieve duty factors larger than 1%.

The discharge tube 3 must be characterized by walls of thickness such that heat generated in the discharge region can be conducted through the tube wall without inducing a temperature difference between inner and outer wall surfaces of more than a few hundred degrees centigrade. Maximum allowable wall thickness is a function of the average power deposited into the discharge and the thermal conductivity of the wall material. At power levels required for rare gas halide laser excitation and duty factors in excess of 1% the maximum wall thickness will lie in the range of 0.1 to 1 millimeter for common cermaic fabrication materials. To assist in rapid removal of waste heat from the region occupied by the tube electrode 5 can also be used as a heat sink with high thermal conductivity.

Since the bore of the discharge tube 3 is typically very small the laser beam propagating through the tube often will experience optical waveguiding effects in tubes of length greater than a few centimeters. Under these conditions the inner surfaces 4 of the tube walls must therefore be capable of guiding ultraviolet waves without excessive scattering or absorption and must be relatively straight and uniformly separated along the tube length.

Figure 1B:
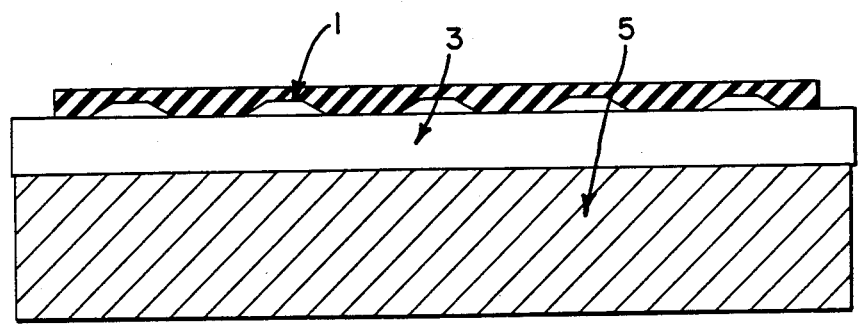

As can be seen from FIG. 1(B), electrode 1 is preferably shaped so as to compensate for standing wave effects encountered at high excitation frequencies.

Figure 2A:
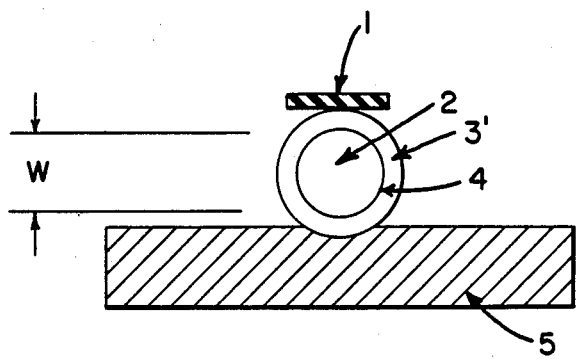
FIGS. 2(A) and 2(B) are cross-sectional views of alternative embodiments of the discharge tube and excitation electrodes of the laser apparatus.
Figure 2B:
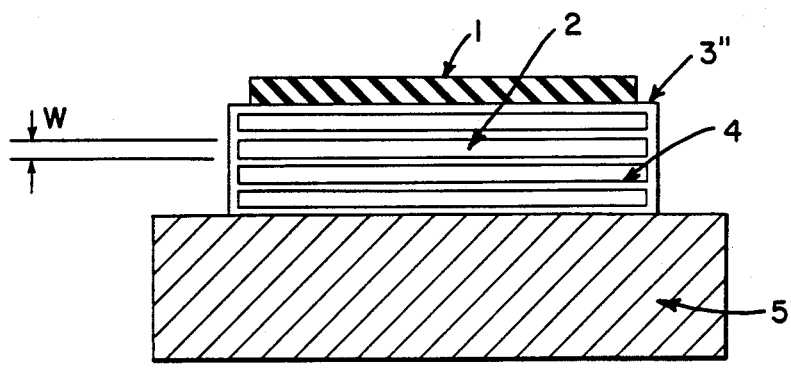

FIGS. 2(A) and 2(B) show alternative embodiments of the discharge tube. In FIG. 2(A), the discharge tube 3' has a cylindrical bore of width W. In FIG. 2(B), the discharge tube 3" is divided by a multiplicity of inner walls so that the distance between opposing walls is W. Like the embodiment of FIG. 1, the distance W is maintained small enough so that wall processes dominate halogen donor recombination.

We claim:

1. A high duty factor rare gas halide laser, comprising:
    (a) a rare gas halide gas mixture composed of at least one rare gas and one halide compound;
    (b) a hollow discharge tube of dielectric material containing said laser gas mixture;
    (c) means for exciting said laser gas mixture by high frequency electrodeless discharge; and
    (d) means for producing rapid recombination throughout said discharge tube of said halide compound after disassociation, comprising inner wall surfaces of said hollow discharge tube that are chemically inert to atomic and molecular species derived from said halide compound.

2. The apparatus of claim 1 wherein said means for exciting said laser gas by said high frequency electrodeless discharge comprises in combination a high frequency electrical generator operating at a frequency between 200 MHz and 10 GHz and two metal electrodes placed on opposing sides of said discharge tube.

3. The apparatus of claim 2 wherein one or both of said electrodes act as a heat sink to remove waste heat from said discharge tube.

4. The apparatus of claim 1 wherein said means for producing rapid recombination of said halide compound comprises inner wall surfaces of said discharge tube, at least two opposing wall surfaces of which are separated by a distance of less than 0.5 millimeters.

5. The apparatus of claim 4 wherein said discharge tube has a rectangular bore therethrough.

6. The apparatus of claim 4 wherein said opposing wall surfaces are separated by a distance of less than 0.2 millimeters.

7. The apparatus of claim 1 wherein said means for producing rapid recombination of said halide compound comprises a cylindrical bore formed in said discharge tube having an inner bore dimension of less than 0.5 millimeters.

8. The apparatus of claim 7 wherein said cylindrical bore has an inner dimension of less than 0.2 millimeters.

9. The apparatus of claim 1 wherein said means for producing rapid recombination of said halide compound comprises a multiplicity of inner wall surfaces of said discharge tube, at least three inner wall surfaces of which are separated by a distance of less than 0.5 millimeters.

10. The apparatus of claim 9 wherein said inner wall surfaces are separated by a distance of less than 0.2 millimeters.

11. The apparatus of claim 1 wherein said inner wall surfaces of said tube form at least one elongated chamber sufficiently smooth and straight to guide ultraviolet laser light.

12. The apparatus of claim 1 further comprising first and second mirrors placed at opposing ends of said discharge tube, said first and second mirrors forming an optical resonator for optical beams passing through the bore of said hollow discharge tube.

13. The apparatus of claim 1 wherein said discharge tube is immersed in a liquid coolant.

* * * * *